April 22, 1930.          W. W. WILLARD          1,755,975
INDICATOR SYSTEM
Filed Oct. 19, 1927
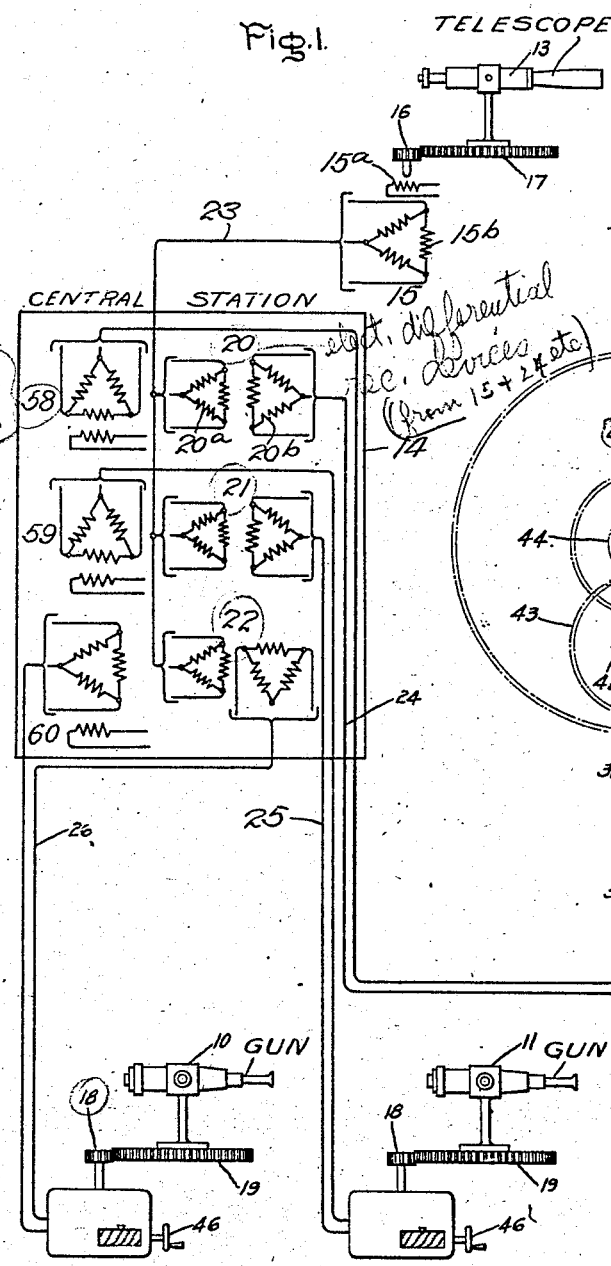
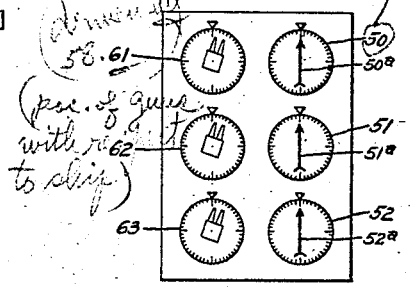
Inventor:
Waldo W. Willard,
by
His Attorney.

Patented Apr. 22, 1930

1,755,975

UNITED STATES PATENT OFFICE

WALDO W. WILLARD, OF SCHENECTADY, NEW YORK, ASSIGNOR TO GENERAL ELECTRIC COMPANY, A CORPORATION OF NEW YORK

INDICATOR SYSTEM

Application filed October 19, 1927. Serial No. 227,323.

My invention relates to position indicator systems for guns, more particularly to a position indicator system for a combination gun and remotely situated controlling sighting instrument, and has for its object the provision of a simple, accurate and reliable system for indicating the position of the gun with relation to both the sighting instrument and the gun support.

My invention has particular application in systems of gun fire control, such as used on battleships, in which the gun is controlled in accordance with the movements of a remotely situated sighting instrument. In one of its aspects my invention relates to the provision of indicating means in an intermediate control station for indicating the angular position of the gun with relation to the sighting instrument and also the position of the gun with relation to the ship.

In carrying out my invention in one form, I provide an electrical transmitting device which is driven by the sighting instrument and a second motion transmitting device which is driven by the gun through suitable parallax corrective means, whereby the angular movements of the gun are referred to the telescope. These two transmitting instruments are electrically connected to a differential motion receiving instrument in the intermediate control station whereby when the gun is pointing at the same object as the telescope, the differential receiving instrument indicates zero. I also provide an electrical receiving instrument in the intermediate station which is driven in a 1:1 ratio by the gun and indicates the angular position of the gun with relation to its support.

For a more complete understanding of my invention reference should be had to the accompanying drawing in which Fig. 1 is a diagrammatic representation of an indicating system embodying my invention; Fig. 2 is a plan view showing the indicating members; Fig. 3 is a simplified view showing the parallax mechanism; while Fig. 4 is a diagrammatic view illustrating the operation of the parallax mechanism.

Referring to the drawing, I have shown my invention in one form in connection with a remotely controlled gun fire control system, such as used on battleships. Three guns 10, 11 and 12 are shown, which may be mounted in separate turrets. These guns are controlled by a single sighting instrument 13 which comprises a suitable sighting device, such as a telescope. It will be understood that the angular movements of the telescope in being brought to bear on the target are transmitted to the gun by suitable transmitting mechanism, not shown, and there utilized in the controlling of the guns, whereby the guns are brought to bear on the target.

In accordance with my present invention, I provide indicating means in a central control station 14 whereby the actual positions of the guns and their relative positions with relation to the telescope can be ascertained at any time. As shown, this indicating system cooperates with the telescope and the guns so as to be responsive to their angular movements in a horizontal or train plane, although obviously the system could be applied to the telescope and guns in vertical or elevation planes as well. An electrical motion transmitting instrument 15 is connected through gears 16 and 17 so as to be driven by the telescope in train. Similar electrical motion transmitting instruments are operatively connected to each gun or gun turret, for example, by means of a gear 18 meshing with the turret rack 19. These transmitting instruments are preferably of a type comprising a single circuit field winding and a cooperating polycircuit armature winding, one of the two windings being mounted on a rotor member. The field windings of the two instruments are energized from a common source of alternating current. As shown the transmitting instruments are driven at a suitable high speed with respect to the telescope and the guns to which they are connected, such as 36:1.

In the intermediate station 14 three electrical differential receiving devices 20, 21 and 22 are provided. These instruments preferably each consists of two polycircuit armature windings, one of which is mounted on a rotor member. These polycircuit armature windings are similar to the armature windings of the transmitting devices and preferably are physically similar to three-phase Y-connected armature windings. One of the armature windings of each of the devices 20, 21 and 22 is connected through suitable conductors indicated by a single line 23 to the armature winding of the transmitter 15, while the remaining armature windings of these devices are connected respectively through suitable conductors represented by the lines 24, 25 and 26 to the armature windings of the transmitters driven by the guns.

In the operation of the system electromotive forces are induced by the field windings of the transmitters in the armature windings of these devices, and these electromotive forces are impressed upon the windings of the differential receivers 20, 21 and 22 whereby magnetic fields are produced by each armature winding of the receivers and the rotor element of each receiver is thereby caused by electromagnetic repulsion to turn to a position in which the field produced by the winding carried by the rotor is in the same direction as the field produced by its stator winding. The armature windings are electrically connected in such manner that rotation of the telescope and guns in the same direction produces opposite directions of rotation of the respective motor fields controlled thereby, whereby the rotors of the receivers are differentially responsive to the movements of the telescope and the guns. Certain features of this differential receiving device are described and claimed in Patent No. 1,628,463 to Newlett and Willard, dated May 10, 1927.

In order that the rotors of the receiving instruments will turn to the same positions when the three guns are pointing on the same target, suitable mechanism is interposed between the driving gear 18 and the transmitter at each gun for introducing a parallax correction whereby the angular movements of each gun are referred to the telescope. Referring to Fig. 3, a gear 27 is secured on the same shaft as the driving gear 18 and the gear 27 meshes with a gear 28 which is secured to the rotor shaft of the transmitting instrument 29. It will be understood that the instrument 29 is the one which has its armature winding connected to a receiver 20, 21 or 22 as the case may be. The stator of the transmitter 29 is rotatably mounted and has a gear 30 secured to it by means of which it may be rotated. This gear 30 meshes with a rack 31 secured to a rod 32 moving in a guide 33, and this rod 32 is connected through a lever arm 34 having an adjustable pivot 35 to a parallel rod 36 moving in a guide 37. The opposite end of the rod 36 is provided with a yoke 38 with which cooperates a pin 39 carried by a gear 40. The gear 40 is connected through gears 41, 42 and 43 to a gear 44 secured to the same shaft as the driving gear 18 whereby the gear 40 is driven at a reduced speed which is in a 1:1 ratio with the movement of the gun or the gun turret rack 19.

The pivot 35 is movable in a guide 45 in a direction at right angles to rods 32 and 36. This adjustment is made by means of a hand-wheel 46 which drives a screw shaft 47 cooperating with a nut secured to the pivot. This adjustment of the pivot is made in accordance with the range, a suitable calibrated range drum 48 being provided whereby the adjustment may be made with accuracy.

The operation of this parallax mechanism will be understood by reference to Fig. 4 which is a diagrammatic representation of the battlefield, the position of the gun being indicated by the point B, while the sighting instrument and target positions are designated by the points A and D, respectively. It will be noted that the distance AB is fixed for any particular gun, while the distance AD, which is the range, is, of course, variable. These distances may be indicated by letters $b$ and $r$ respectively. In the diagram drop a perpendicular from point A to line BD, intersecting line BD at some point E.

Then $$AE = b \sin \phi = r \sin \alpha$$

$$\therefore \sin \alpha = \frac{b \sin \phi}{r}$$

For small angles the sine is equal to the angle $$\therefore \text{for small values, } \alpha = \frac{b}{r} \sin \phi$$

From the above it will be observed that the parallax angle $\alpha$ can be introduced by applying an angular movement to the stator of the transmitter 29 proportional to $\frac{b}{r} \sin \phi$. The gear 40, however, has the same angular movement as that applied to the gun and therefore generates the angle $\phi$ while the rod 36 is given a movement proportional to $\sin \phi$. The distance $b$ is fixed for any any particular gun and the only other variable to be introduced is therefor the range $r$, which as previously noted is introduced by turning the handwheel 46 whereby the pivot 35 is adjusted. It will be understood that with the guns mounted in different turrets at different distances from the sighting instrument, the scale on the range drum 48 is calibrated for the range adjustment and also to take into consideration the particular distance $b$ of the gun from the sighting instrument. The movement applied to the stator 29 by the rack is thus proportional to the parallax angle so that the output of the transmitter is corrected for parallax and is the same as it would be if the gun were located in the same position as the sighting instrument. The output of each transmitter 29 when the guns are pointing on the same target as the telescope will therefore be the same as the output of the transmitter 15, and consequently the dials 50, 51 and 52 driven by the receivers 20, 21 and 22 respectively will each indicate zero under these conditions.

Preferably, each dial is provided with a straight mark extending across the dial. As shown, the dials are provided with arrows 50ª, 51ª and 52ª extending diametrically across them. The arrangement of the dials with respect to their driving means is such that when the telescope and the guns are all pointing on a common target the arrows will be in alignment with each other. In the arrangement shown, the dials are mounted one above each other in vertical alignment, and the arrows, under the conditions mentioned, each point upward. A visual illusion is therefore made of a continuous vertical line which line is obviously more distinct than each individual arrow by itself, and, furthermore any slight deviation of one or more dials from the position of alignment is very readily perceived. In other words, by means of this arrangement the zero position and any deviation therefrom is much easier to see than it would be with the dials mounted at some distance apart or with different zero positions.

I also provide a second transmitter 53 driven by each gun in a 1:1 ratio therewith. This transmitter has its rotor connected to the gear 41. Its stator is rotatably mounted and is given a parallax adjustment from the rod 32 by means of a wedge-shaped member 54 secured to the rod and presenting an inclined surface. The roller 55 carried by one end of a bell crank 56 bears on this surface and the other end of the bell crank is connected through a link 57 to one side of the stator of the transmitter 53. These transmitters 53 operated by the three guns are electrically connected to receiving instruments 58, 59 and 60, respectively, in the intermediate station. The receiving instruments are similar in construction to the transmitting instruments and they have their field windings energized from the same source of alternating current so that their rotors reproduce the movements applied to the transmitters. They operate dials 61, 62 and 63, Fig. 3, which indicate the actual positions of the guns with respect to the ship, the movements of the guns however being corrected for parallax so that when the guns are all pointing on the same target the dials give the same indication. Any inaccuracy such as might arise if the gun transmitter 29 should lose a complete revolution of movement is avoided by observing the relation of the corresponding 1:1 speed dial with the other 1:1 speed dials. To insure that the guns are all pointing on the same target the 1:1 speed dials 61, 62 and 63 should occupy corresponding positions with respect to each other, and the 36:1 speed dials 50, 51 and 52 should have their indicating marks in alinement as previously indicated. This condition is illustrated in Fig. 2 of the drawing.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States is:—

1. The combination in a system of gun fire control comprising a sighting instrument and a plurality of guns controlled thereby, of an intermediate station, an indicating instrument in said station comprising a plurality of indicating members mounted for rotation about axes spaced relatively with respect to each other, means for operating said members in accordance with the relative movements of said sighting instrument and said guns respectively whereby said members are returned to zero positions when the guns and said sighting instrument are directed on the same target, said indicating members being arranged to be in alinement when in zero positions.

2. The combination in a system of gun fire control comprising a sighting instrument and a plurality of guns controlled thereby, of an intermediate station, an indicating instrument in said station comprising a plurality of indicating members mounted for rotation about axes spaced relatively with respect to each other so that said members are in alinement, electrical means for transmitting the movements of said sighting instrument and said guns, differential driving means for each of said members connected jointly to the transmitting means driven by said sighting instrument and the transmitting means driven by one of said guns, whereby said members are returned to zero positions when the guns and said sighting instrument are directed on the same target, and elongated marks on said members arranged to be in alinement when said members are in predetermined positions.

3. An indicator system for gun control means of the type consisting of a plurality of guns controlled from a remotely situated sighting instrument, comprising electrical means for transmitting the movements of said sighting instrument and said guns, a plurality of dials mounted for rotation about axes spaced relatively so that said dials are in alinement, electrical differential driving means for each of said dials connected jointly to the transmitting means driven by said sighting instrument and the transmitting means driven by one of said guns whereby said dials are each returned to a zero position when the guns are pointing on the same target as said sighting instrument, and indicating marks extending across said dials, said marks being arranged to be in alinement when said dials are in zero positions.

In witness whereof, I have hereunto set my hand this 18th day of October, 1927.

WALDO W. WILLARD.